US009460817B2

(12) United States Patent
Hamamoto et al.

(10) Patent No.: US 9,460,817 B2
(45) Date of Patent: Oct. 4, 2016

(54) SUPPORT PIN REPLACING APPARATUS FOR CONTROL ROD CLUSTER GUIDE TUBE

(75) Inventors: Tomochika Hamamoto, Tokyo (JP); Norimasa Mori, Tokyo (JP); Yoshiyuki Miyoshi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 337 days.

(21) Appl. No.: 14/125,445

(22) PCT Filed: Aug. 2, 2012

(86) PCT No.: PCT/JP2012/069745
§ 371 (c)(1),
(2), (4) Date: Dec. 11, 2013

(87) PCT Pub. No.: WO2013/024708
PCT Pub. Date: Feb. 21, 2013

(65) Prior Publication Data
US 2014/0126681 A1    May 8, 2014

(30) Foreign Application Priority Data

Aug. 12, 2011 (JP) .................... 2011-177210

(51) Int. Cl.
*G21C 19/20* (2006.01)
*B23H 9/00* (2006.01)
(Continued)

(52) U.S. Cl.
CPC ............... *G21C 19/207* (2013.01); *B23H 9/00* (2013.01); *B23H 9/001* (2013.01); *G21C 19/20* (2013.01); *B23H 1/00* (2013.01); *G21C 7/117* (2013.01); *G21D 3/001* (2013.01)

(58) Field of Classification Search
CPC .... G21C 19/207; G21C 19/20; G21C 7/117; G21D 3/001; B23H 9/001; B23H 9/00; B23H 1/00
USPC .................................................. 376/260, 258
See application file for complete search history.

(56) References Cited

U.S. PATENT DOCUMENTS 4,577,361 A    3/1986  Hornak
4,585,613 A *  4/1986  Styskal ................. G21C 19/32
                                                                    376/260

(Continued)

FOREIGN PATENT DOCUMENTS

DE         4138348 A1    6/1992
FR         2931581 A1    11/2009
(Continued)

OTHER PUBLICATIONS

International Search Report dated Nov. 6, 2012 issued in corresponding application No. PCT/JP2012/069745.
(Continued)

*Primary Examiner* — Jack W Keith
*Assistant Examiner* — Daniel Wasil
(74) *Attorney, Agent, or Firm* — Westerman, Hattori, Daniels & Adrian, LLP

(57) ABSTRACT

Apparatus for replacing a support pin for a control rod cluster guide tube. The support pin can fix the guide tube to a core plate. The apparatus can be used submerged in water. A movement device can hold and move the guide tube along a frame. A retrieval manipulator can remove an old support pin from the guide tube. A supply manipulator can provide a new support pin to the guide tube. A rotating means imparts rotation for loosening a nut from an old support pin, and for tightening a nut to a new support pin. A control device calculates variation in distance between the nut and the support pin on the basis of the rotation. The control device controls movement of the guide tube along the frame.

6 Claims, 19 Drawing Sheets

(51) Int. Cl.
  *G21C 7/117* (2006.01)
  *G21D 3/00* (2006.01)
  *B23H 1/00* (2006.01)

(56) References Cited

U.S. PATENT DOCUMENTS

| | | | |
|---|---|---|---|
| 4,675,961 A | 6/1987 | Spofford et al. | |
| 4,720,898 A * | 1/1988 | Calfo | G21C 7/08 376/260 |
| 4,748,733 A | 6/1988 | Hahn et al. | |
| 4,756,067 A | 7/1988 | Howell et al. | |
| 6,026,137 A * | 2/2000 | Bevilacqua | G21C 13/02 376/260 |

FOREIGN PATENT DOCUMENTS

| | | |
|---|---|---|
| JP | 61-3089 A | 1/1986 |
| JP | 61-3090 A | 1/1986 |
| JP | 61-3091 A | 1/1986 |
| JP | 61-3092 A | 1/1986 |
| JP | 9-43387 A | 2/1997 |

OTHER PUBLICATIONS

Written Opinion of the International Searching Authority dated Nov. 6, 2012 issued in corresponding application No. PCT/JP2012/069745.
Extended European Search Report dated Feb. 26, 2015, issued in corresponding EP Patent Application No. 12823913.4 (5 pages).
Japanese Decision of a Patent Grant dated Mar. 10, 2015, issued in corresponding JP Patent Application No. 2011-177210 with English translation (3 pages).
Translation of Written Opinion dated Sep. 18, 2012, issued in counterpart International Application No. PCT/JP2012/063997 (3 pages).
Translation of Written Opinion dated Nov. 6, 2012, issued in counterpart International Application No. PCT/JP2012/069745 (4 pages).
Official Communication under Rule 71(3) EPC dated May 27, 2016, issued in counterpart European Patent Application No. 12 823 913.4. (59 pages).

* cited by examiner

SUPPORT PIN REPLACING APPARATUS FOR CONTROL ROD CLUSTER GUIDE TUBE

FIELD

The present invention relates to a support pin replacing apparatus for a control rod cluster guide tube.

BACKGROUND

A plurality of control rod cluster guide tubes are stationary and mounted on an upper core plate of a nuclear reactor. A support pin for fixing the control rod cluster guide tube is required to be replaced periodically or as occasion arises. Patent Literatures 1 to 3 have described a support pin replacing apparatus for a control rod cluster guide tube.

CITATION LIST

Patent Literature

Patent Literature 1: Japanese Laid-open Patent Publication No. 61-003090
Patent Literature 2: Japanese Laid-open Patent Publication No. 61-003091
Patent Literature 3: Japanese Laid-open Patent Publication No. 09-043387

SUMMARY

Technical Problem

However, in the support pin replacing apparatus for a control rod cluster guide tube described in Patent Literatures 1 and 2, it is not possible to perform all operation under water, and the operation is thus performed utilizing gas environments. The support pin replacing apparatus for a control rod cluster guide tube described in Patent Literature 3 does not specifically contemplate automation of replacement of the support pin.

The present invention is intended to solve the above problems, and an object thereof is to provide a support pin replacing apparatus for a control rod cluster guide tube that allows automation of replacement of a support pin in an underwater environment.

Solution to Problem

According to an aspect of the present invention, a support pin replacing apparatus for a control rod cluster guide tube includes: a frame submerged in water; a movement device that holds the control rod cluster guide tube and moves the control rod cluster guide tube along the frame; a retrieval manipulator that retrieves a support pin of the control rod cluster guide tube under the water; a supply manipulator that supplies a new support pin to the control rod cluster guide tube in the water; a rotating means that imparts rotation for loosening or tightening a fastening between a nut of the support pin or the new support pin and a support pin main body; and a control device that calculates variation in distance between the nut and the support pin main body on the basis of the rotation, and controls the control rod cluster guide tube to move along the frame in accordance with the variation in distance calculated by the movement device.

Accordingly, automation of replacement of a support pin can be achieved in an underwater environment. As a result, effects of radiation on operators can be reduced. Further, operational time required for the replacement of the support pin can be shortened.

Advantageously, in the support pin replacing apparatus for a control rod cluster guide tube, the control rod cluster guide tube includes a middle flange to be fixed to an upper core support plate, and a lower flange to be fixed to an upper core plate by means of the support pin or the new support pin, and the movement device holds the middle flange. Accordingly, the control rod cluster guide tube can be held with the posture thereof being constantly stable.

Advantageously, in the support pin replacing apparatus for a control rod cluster guide tube, the retrieval manipulator has an unfastening means that unfastens a fixed fastening between the nut and the support pin main body. Accordingly, the fastening between a nut of the support pin and a support pin main body can be loosened.

Advantageously, in the support pin replacing apparatus for a control rod cluster guide tube, the unfastening means is an electrical discharge machining tool, and the fixed fastening between the nut and the support pin main body is unfastened by electrical discharge machining of the electrical discharge machining tool so that the nut and the support pin main body are brought into a rotatable state. Accordingly, the fastening between the nut of the support pin and the support pin main body can be loosened.

Advantageously, in the support pin replacing apparatus for a control rod cluster guide tube, the frame is partitioned such that a retrieval operation rack, in which the retrieval manipulator operates is adjacent to a supply operation rack, in which the supply manipulator operates, and the movement device moves the control rod cluster guide tube from the retrieval operation rack to the supply operation rack. Accordingly, the time required for replacement of the support pin with a new support pin can be shortened.

Advantageously, in the support pin replacing apparatus for a control rod cluster guide tube, the retrieval manipulator and the supply manipulator allow replacement of tools. Accordingly, the operational time can be shortened.

Advantageous Effects of Invention

According to the present invention, there can be provided a support pin replacing apparatus for a control rod cluster guide tube that allows automation of replacement of the support pin in underwater environments.

BRIEF DESCRIPTION OF DRAWINGS

FIG. 5-1 is a schematic of a perspective view of an example of the support pin of the control rod cluster guide tube.
FIG. 5-2 is a schematic of a top sectional view of the support pin of FIG. 5-1.

FIG. 8-1 is a block diagram illustrating a system of the support pin replacing apparatus for the control rod cluster guide tube.

FIG. 8-2 is an illustrative view illustrating a control device.

FIG. 10-1 is an illustrative view illustrating an example of an unfastening procedure.

FIG. 10-2 is an illustrative view illustrating a different example of an unfastening procedure.

FIG. 16-1 is an illustrative view illustrating a different example of a new nut tightening procedure.

FIG. 16-2 is an enlarged top view illustrating a main portion of FIG. 16-1.

FIG. 18-1 is a schematic of an example of the support pin.

FIG. 18-2 is a top view of FIG. 18-1.

DESCRIPTION OF EMBODIMENTS

A mode for practicing the present invention (embodiment) will be described in detail with reference to accompanying drawings. The present invention is not limited to the contents of the below described embodiment. Constituent elements described in the following embodiment include those that can be easily assumed by persons skilled in the art, and those that are substantially equivalent thereto. The constituent elements described in the following embodiment can be appropriately combined with each other.

Figure 1:
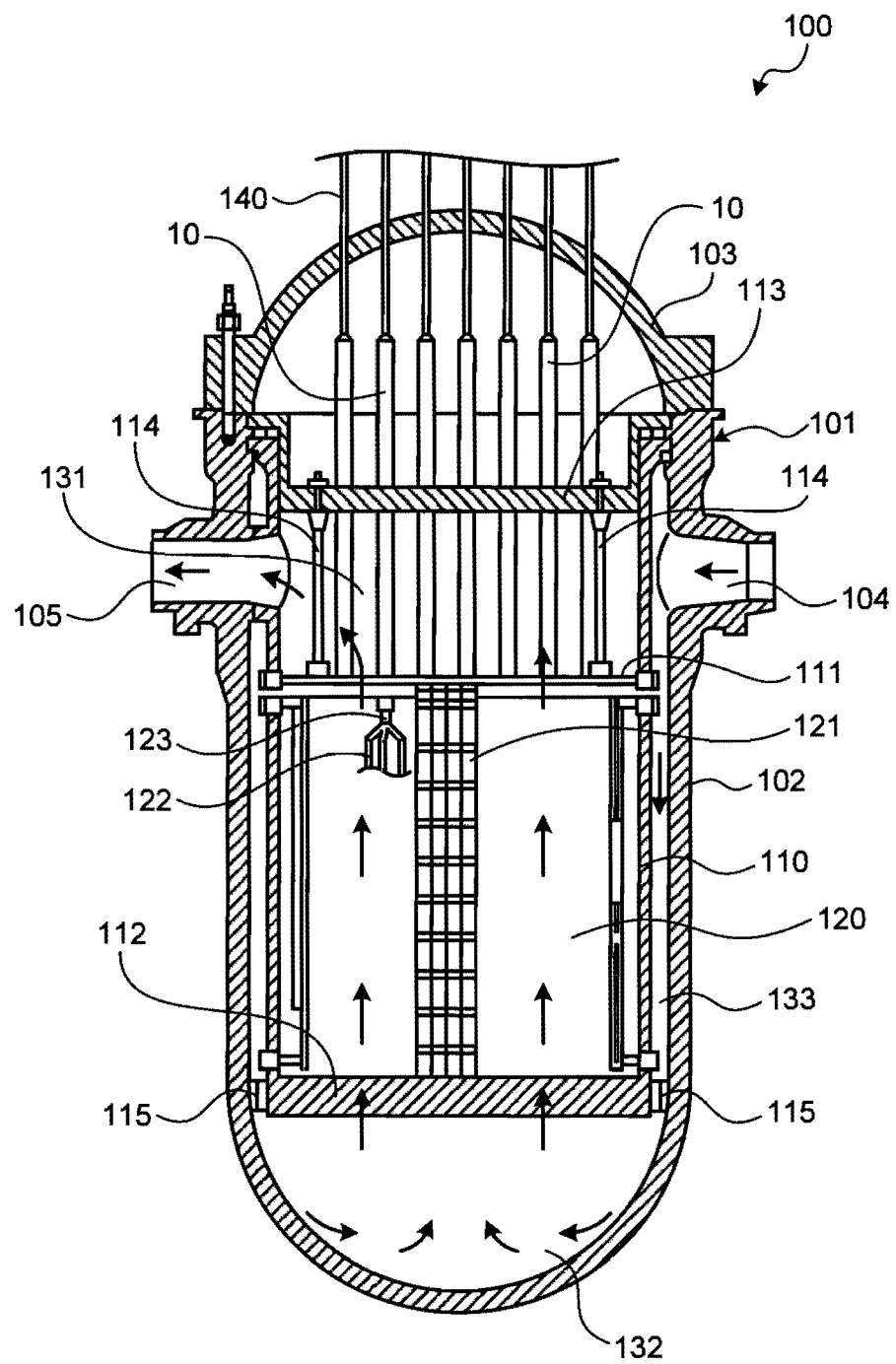
FIG. 1 is a schematic view of a nuclear reactor.

FIG. 1 is a schematic view of a nuclear reactor. It should be noted that in the following description, a description will be made while the upper side of a nuclear reactor 100 in an installed state when used and the upper side in each section are on the same side, and the lower side thereof in the installed state when used and the lower side in each section are on the same side. The nuclear reactor 100 illustrated in FIG. 1 is a pressurized water reactor (PWR), in which a passage used in extracting energy is separated into a primary cooling system and a secondary cooling system. A nuclear power plant using a pressurized water reactor will now be schematically described. In the pressurized water reactor, light water (coolant) is used as a reactor coolant and a neutron moderator. By providing a pressurizer (illustration is omitted) in the primary cooling system which is a circulation passage of the light water, the primary cooling system makes the light water into high-temperature and high-pressure water which does not boil over the entire reactor core. The primary cooling system sends the high-temperature and high-pressure water to a steam generator (illustration is omitted), which is a section for performing a heat exchange with the secondary cooling system, and performs a heat exchange with light water circulating through the secondary cooling system. The secondary cooling system generates steam by this heat exchange, and sends the generated steam to a turbine generator (illustration is omitted), so that a power is generated at the turbine generator.

In the nuclear reactor 100 according to the present embodiment, which is provided as a pressurized water reactor as described above, a reactor vessel 101 provided as a pressure vessel is configured by a reactor vessel main body 102 and a reactor vessel head 103 which is attached to the upper portion of the reactor vessel main body 102 and which can be opened or closed with respect to the reactor vessel main body 102 so that a reactor core internal can be inserted therein. Of these, the reactor vessel main body 102 is formed in a substantially cylindrical shape such that the upper portion thereof in a vertical direction when the nuclear reactor 100 is installed is opened, and the lower portion thereof is closed to provide a spherical shape. Also, the reactor vessel main body 102 includes an inlet nozzle 104 and an outlet nozzle 105 formed in the vicinity of the upper end side which is an end portion on the opening side and provided for supplying and discharging light water as primary cooling water, which is cooling water used in the primary cooling system.

Inside the reactor vessel main body 102, below the inlet nozzle 104 and the outlet nozzle 105, there is provided a core barrel 110 formed in a substantially cylindrical shape. The core barrel 110 is formed to have a substantially cylindrical shape. The core barrel 110 is provided to have a predetermined space between the inner surface of the reactor vessel main body 102 and the core barrel 110, and provided such that the central axis thereof coincides with that of the cylindrical shape of the reactor vessel main body 102.

Inside the reactor vessel main body 102, the upper portion of the core barrel 110 is coupled to an upper core plate 111. The upper core plate 111 is formed in a circular plate shape and includes a number of continuous holes (illustration is omitted) passing therethrough. The upper core plate 111 is horizontally provided inside the reactor vessel main body 102. Also, the lower portion of the core barrel 110 is coupled to a lower core plate 112. Similarly to the upper core plate 111, the lower core plate 112 is formed in a circular plate shape and includes a number of continuous holes (illustration is omitted) passing therethrough. The lower core plate 112 is horizontally provided inside the reactor vessel main body 102.

Inside the reactor vessel main body 102, above the core barrel 110, an upper core support plate 113 is fixed. A plurality of reactor core support rods 114 are provided in a suspended manner from the upper core support plate 113, and the upper core plate 111 is supported in a suspended manner via the reactor core support rods 114. That is, the upper core plate 111 is supported by the upper core support plate 113 in a suspended manner via the reactor core support rod 114, as a consequence of which, the core barrel 110 that is coupled to the upper core plate 111 is also supported by the upper core support plate 113 in a suspended manner. On the other hand, the lower core plate 112 is positioned and held by a plurality of radial keys 115 with respect to the inner surface of the reactor vessel main body 102. As a result, the core barrel 110 is positioned and held by the plurality of radial keys 115 with respect to the inner surface of the reactor vessel main body 102.

Further, a reactor core 120 is formed by the core barrel 110 which is thus provided, the upper core plate 111, and the lower core plate 112. In the reactor core 120, a number of fuel assemblies 121 are disposed. The fuel assembly 121 is formed by bundling a number of fuel rods in a grid shape by a support grid. Also, the fuel assembly 121 is configured such that a control rod 122 can be inserted therein. A control rod cluster 123 is composed of a plurality of upper ends of the control rods 122 combined at a single point. The upper core plate 111 is supported by a number of control rod cluster guide tubes 10 passing through the upper core support plate 113. The control rod cluster guide tube 10 serves to guide the control rod cluster 123, and the upper end portion thereof which is passing through the reactor vessel head 103 is extended to a control rod driving mechanism (illustration is omitted). A control rod cluster drive shaft 140 extending out from the control rod driving mechanism passes through the control rod cluster guide tube 10 to connect to the control rod cluster 123, and extends out to the fuel assembly 121. Although not illustrated, a number of in-core monitor guide tubes passing through the upper core support plate 113 are supported by the upper core support plate 113. The in-core monitor guide tubes, each of which lower end portion is extended to the fuel assembly 121, and is provided such that a sensor capable of measuring a neutron flux versus the fuel assembly 121 can be inserted therein.

Inside the reactor vessel main body 102, a portion positioned above the reactor core 120 and communicated with the outlet nozzles 105 is formed as an upper plenum 131. On the other hand, a hemispherical space positioned below the reactor core 120 and defined by the lower core plate 112 and the spherical inner surface of the closed portion of the lower portion of the reactor vessel main body 102 is formed as a lower plenum 132. Further, a portion formed between the reactor vessel main body 102 and the core barrel 110 and communicated with the inlet nozzle 104 and the lower plenum 132 is formed as a downcomer portion 133. The upper plenum 131 is formed by being partitioned by the core barrel 110, the upper core support plate 113, and the upper core plate 111. The upper plenum 131 is communicated with the outlet nozzles 105 and is communicated with the reactor core 120 via a number of continuous holes formed in the upper core plate 111. The lower plenum 132 is formed by being partitioned by the lower core plate 112, which is the bottom portion of the core barrel 110, and the reactor vessel main body 102, and is communicated with the reactor core 120 via a number of continuous holes formed in the lower core plate 112. The downcomer portion 133 is formed by being partitioned by the reactor vessel main body 102 and the side wall of the core barrel 110. The upper portion of the downcomer portion 133 is communicated with the inlet nozzle 104, and the lower portion thereof is communicated with the lower plenum 132.

When operating the thus configured nuclear reactor 100, while circulating light water used as a coolant and a neutron moderator therethrough, a fissile material such as uranium 235 or plutonium contained in the fuel assembly 121 as a fuel constituting the fuel assembly 121 is allowed to make a nuclear fission reaction. In the case where a nuclear fission reaction occurs for a fissile material, an insertion amount of the control rod 122 into the fuel assembly 121 is adjusted by the control rod driving mechanism provided in the reactor vessel head 103. With this configuration, a nuclear fission reaction in the reactor core 120 is controlled. When the fissile material fissions, a thermal energy is generated. However, since the surroundings of the fuel assembly 121 are filled up with the circulating light water, this thermal energy is transmitted to the light water surrounding the fuel assembly 121. With this configuration, the light water filled inside the nuclear reactor vessel 101 is heated. As described above, the high-temperature light water which has been heated by the thermal energy generated upon the nuclear fission reaction is discharged from the outlet nozzle 105 and is sent to the steam generator.

That is, the fissile material contained in the fuel assembly 121 discharges neutrons by the fission thereof. The light water used as a moderator and cooling water in the primary cooling system lowers the kinetic energy of the discharged fast neutrons so that they are turned into thermal neutrons, makes new fission more likely to occur, and takes away the generated heat to achieve cooling.

Further, the control rod 122 is provided so that the neutrons generated in the reactor core 120 can be adjusted by absorbing neutrons discharged upon the fission of a fissile material. For example, when an insertion amount of the control rod 122 into the fuel assembly 121 is increased, an amount of neutrons absorbed by the control rod 122 is increased. Therefore, an amount of neutrons making the fissile material fission is decreased. Conversely, when the control rod 122 is moved in a pull-out direction to reduce an insertion amount of the control rod 122 into the fuel assembly 121, an amount of neutrons absorbed by the control rod 122 is reduced. Therefore, an amount of neutrons making the fissile material fission is increased. Accordingly, it is possible to change a frequency with which the fissile material fissions. Therefore, when operating the nuclear reactor 100, a nuclear fission reaction is controlled by adjusting the insertion amount of the control rod 122, and the amount of thermal energy generated by the fission reaction is thereby adjusted.

Further, when operating the nuclear reactor 100, light water is circulated in the primary cooling system. This light water flows into the reactor vessel main body 102 from the inlet nozzle 104. Then, the light water flows down in a downward direction through the downcomer portion 133 communicated with the inlet nozzles 104 to reach the lower plenum 132, and then changes the flowing direction thereof upwardly by the spherical shaped inner surface of the lower plenum 132. With this configuration, the light water rises out from the lower plenum 132, passes through the continuous hole of the lower core plate 112, and then flows into the reactor core 120. The light water having flowed into the reactor core 120 absorbs the thermal energy generated from the fuel assembly 121 disposed in the reactor core 120, thereby cooling the fuel assembly 121. On the other hand, the temperature of the light water becomes high, and the light water rises up to the upper core plate 111. The high-temperature light water having reached the upper core plate 111 passes through the continuous hole in the upper core plate 111 to reach the upper plenum 131, and is then discharged from the reactor vessel main body 102 through the outlet nozzles 105.

Figure 2:
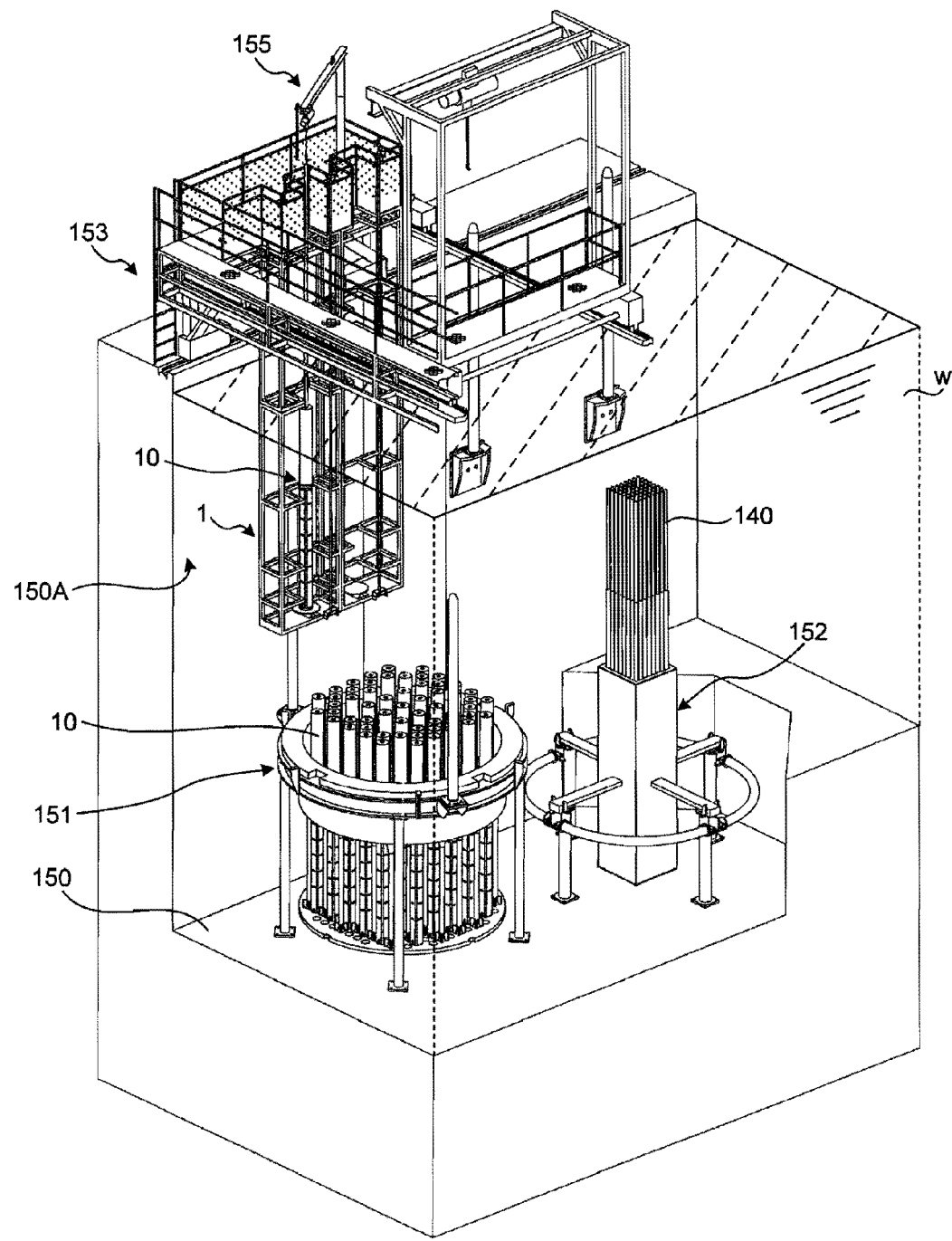
FIG. 2 is a schematic view of a cavity, in which a support pin replacing apparatus for a control rod cluster guide tube is installed.

The control rod cluster guide tube 10 may also be affected by the operation of the nuclear reactor 100, and replacement of a below described support pin for fixing the control rod cluster guide tube 10 to the upper core plate 111 may be required. FIG. 2 is a schematic view of a cavity, in which a support pin replacing apparatus for a control rod cluster guide tube is installed. A support pin replacing apparatus 1 for the control rod cluster guide tube 10 is installed on a wall surface 150A of a cavity 150 via a cradle 153, and is submerged in light water W. Inside the cavity 150, a control rod cluster guide tube temporary stand 151 and a control rod cluster drive shaft temporary stand 152 are installed. Also, on the cradle 153, there is provided a crane 155 capable of transporting the control rod cluster guide tube 10 and the control rod cluster drive shaft 140.

Figure 3:
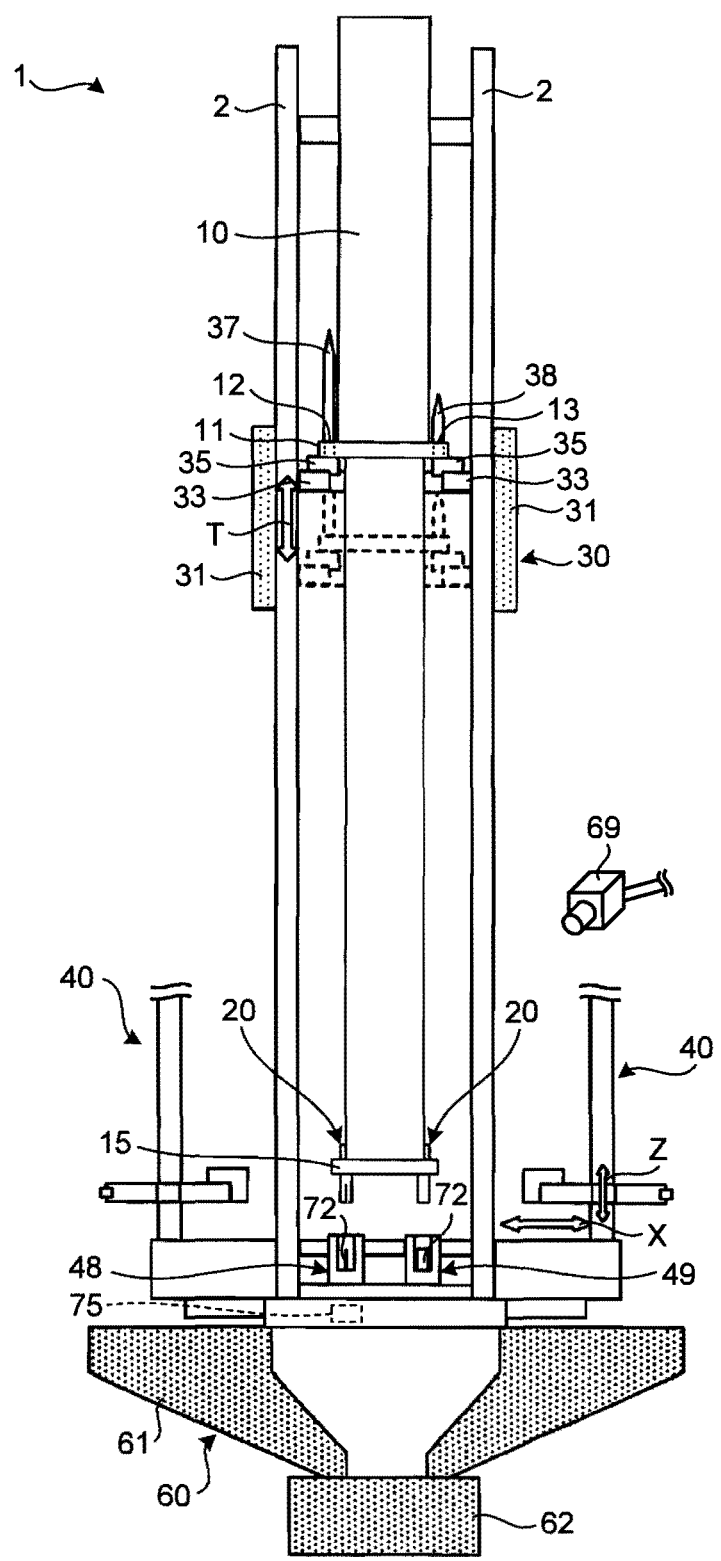
FIG. 3 is a schematic of a front sectional view of the support pin replacing apparatus for the control rod cluster guide tube.
Figure 4:
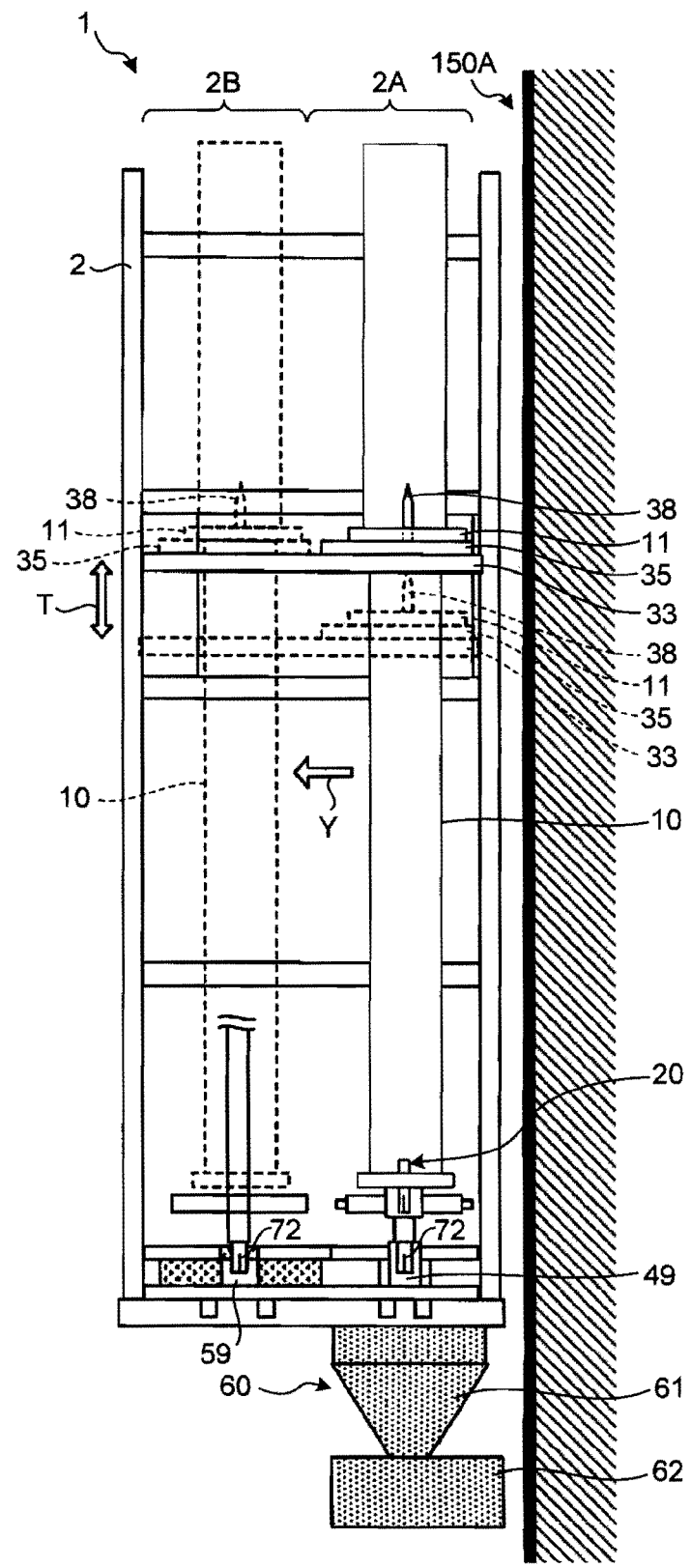
FIG. 4 is a schematic of a side sectional view of the support pin replacing apparatus for the control rod cluster guide tube.

FIG. 3 is a schematic of a front sectional view of the support pin replacing apparatus for the control rod cluster guide tube. FIG. 4 is a schematic of a side sectional view of the support pin replacing apparatus for the control rod cluster guide tube. The support pin replacing apparatus 1 is a device for replacing a support pin 20 of the control rod cluster guide tube 10. The support pin replacing apparatus 1 has a frame 2, a movement device 30, a retrieval manipulator 40, a below described supply manipulator 50, a rotating means 75, and a below described control device 80. The support pin replacing apparatus 1 preferably has a support pin retrieval mechanism 60. The frame 2 is a base for fixing the movement device 30, the retrieval manipulator 40, and the supply manipulator 50 thereto. The frame 2 is partitioned such that a retrieval operation rack 2A, in which the retrieval manipulator 40 operates, is adjacent to a supply operation rack 2B, in which the supply manipulator 50 operates. The movement device 30 supports the control rod cluster guide tube 10 so that the control rod cluster guide tube 10 can be moved from the retrieval operation rack 2A of the retrieval manipulator 40 to the supply operation rack 2B of the supply manipulator 50.

Figures 1, 5:
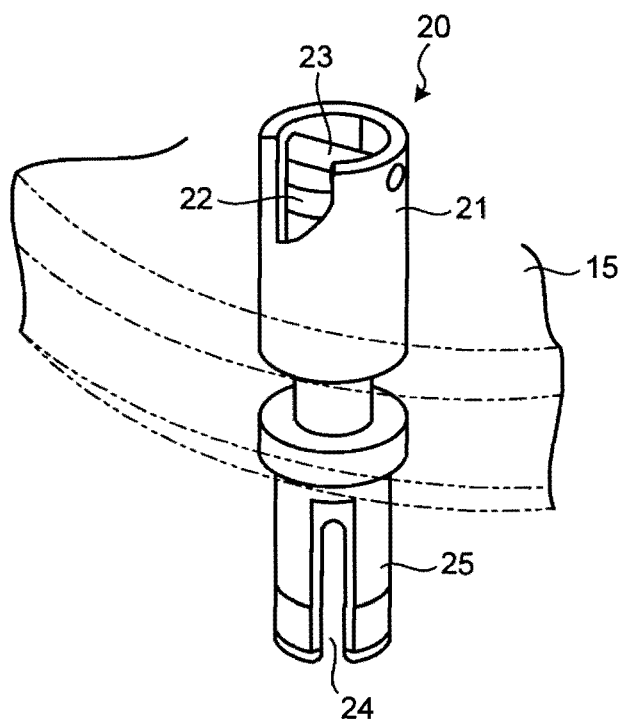
Figures 2, 5:
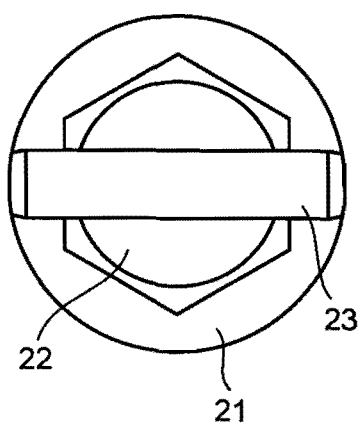

The control rod cluster guide tube 10 has a middle flange 11 for fixing to the upper core support plate 113, and a lower flange 15 for fixing to the upper core plate 111. The middle flange 11 has guiding holes 12 and 13 passing through the middle flange 11. The lower flange 15 is removed from the upper core plate 111 with the support pin 20 for fixing to the upper core plate 111 passing through the lower flange 15. The support pin 20 is attached at two locations 180 degrees symmetrical with respect to each other via the control rod cluster guide tube 10. FIG. 5-1 is a schematic of a perspective view of an example of the support pin of the control rod cluster guide tube. FIG. 5-2 is a schematic of a top sectional view of the support pin of FIG. 5-1.

For example, the support pin 20 illustrated in FIG. 5-1 and FIG. 5-2 has a nut 21 having female threads therein, a support pin main body 22 having male threads therein, a locking pin 23, a support portion 25 for fixing to the upper core plate 111, and a slit 24 provided on the support portion 25. The nut 21 and the support pin main body 22 are screwed and fastened. It should be noted that the locking pin 23 and the support pin main body 22 illustrated in FIG. 5-2 are welded and fixed together to ensure the fastening.

The movement device 30 illustrated in FIG. 3 and FIG. 4 has a motion cradle rail lifting device 31, a motion cradle rail sliding device 33, and a motion cradle 35. The motion cradle rail lifting device 31 is a device for moving the motion cradle 35 in a vertical direction (T direction) in the frame 2. The motion cradle rail sliding device 33 is a device for moving the motion cradle 35 in a horizontal direction (Y direction, or a direction opposite to the Y direction in FIG. 4). The motion cradle 35 is a cradle for placing the middle flange 11 thereon. The motion cradle 35 has positioning pins 37 and 38. When the positioning pins 37 and 38 pass through the guiding holes 12 and 13, the control rod cluster guide tube 10 is positioned and fixed on the motion cradle 35. This configuration allows the movement device 30 to move the control rod cluster guide tube 10 on the motion cradle 35 to a predetermined position along the frame 2.

Figure 6:
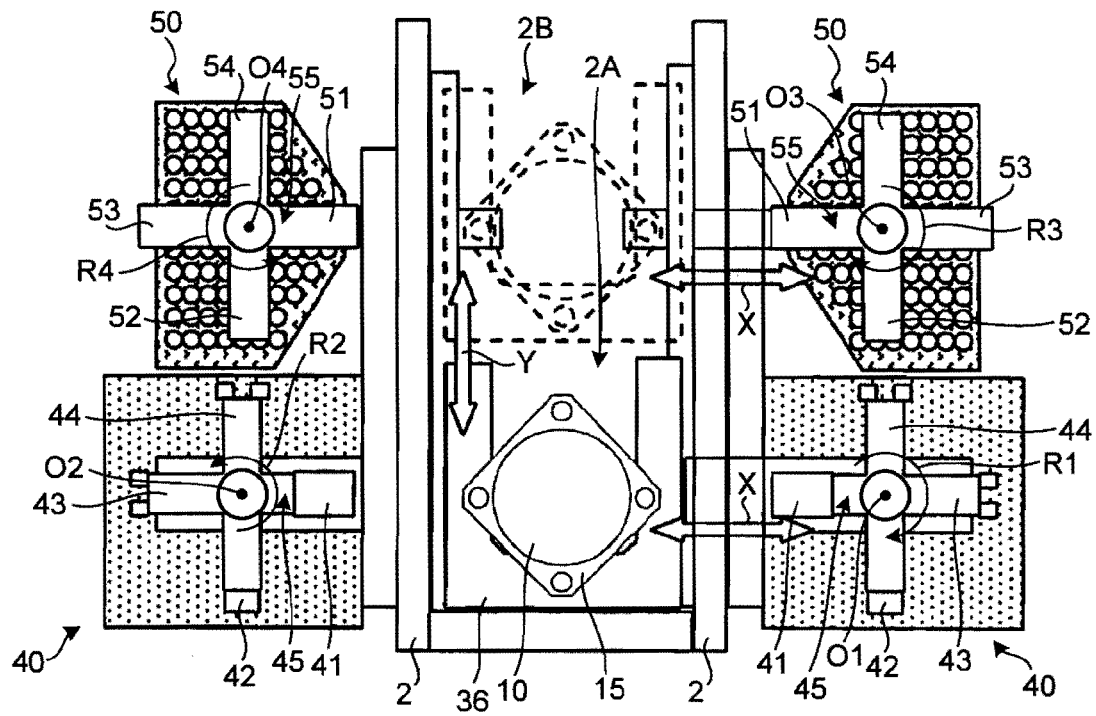
FIG. 6 is a schematic of a top sectional view of retrieval manipulators and supply manipulators.

FIG. 6 is a schematic of a top sectional view of retrieval manipulators and supply manipulators. The retrieval manipulators 40 and the supply manipulators 50 of the present embodiment are preferably disposed to be adjacent to each other in the horizontal direction as illustrated in FIG. 4 and FIG. 6. Accordingly, the distance that the movement device 30 moves the control rod cluster guide tube 10 from the retrieval operation rack 2A to the supply operation rack 2B can be shortened, and thus the operational time can be reduced. It is preferable that the frame 2 has the lower flange 15 of the control rod cluster guide tube 10 placed thereon, and a sliding mechanism 36 that can be slid in the Y direction. Accordingly, the position error of the support pin 20 located in the lower flange 15 of the control rod cluster guide tube 10 can be reduced, and operational time involved in alignment thus can be reduced.

The retrieval manipulators 40 of the present embodiment, each of which has an electrical discharge machining tool 41, a fixing tool 42, a nut retrieval tool 43, a support pin retrieval tool 44, and a tool replacement mechanism 45. The tool replacement mechanism 45, each of which holds the electrical discharge machining tool 41, the fixing tool 42, the nut retrieval tool 43, and the support pin retrieval tool 44. The tool replacement mechanism 45 has, for example, a rotating mechanism rotating in R1 and R2 directions about axes O1 and O2 respectively, and a sliding mechanism moving in the X direction. This configuration allows the tool replacement mechanism 45 to replace tools for each procedure. Further, as illustrated in FIG. 3, the retrieval manipulator 40 is movable also in a Z direction which is the vertical direction. The retrieval manipulator 40 is capable of unfastening the fixed fastening of the support pin 20 located in the lower flange 15, and of retrieving the nut 21 and the support pin main body 22 while replacing the tools in accordance with the predetermined procedure.

Figure 7:
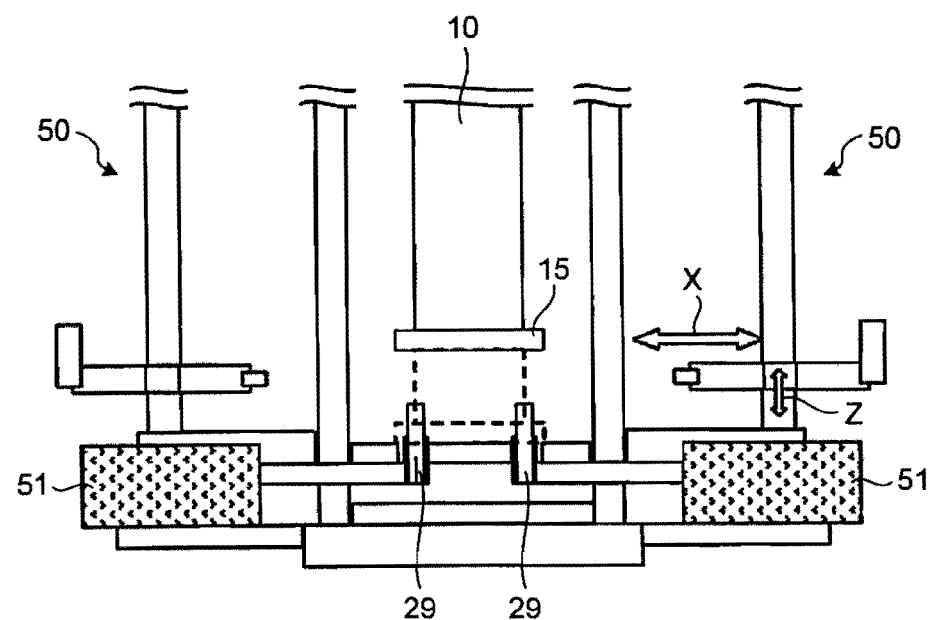
FIG. 7 is a schematic of a front sectional view of the supply manipulators.

The supply manipulators 50 of the present embodiment, each of which has a support pin supplying tool 51, a nut supplying tool 52, a nut tightening tool 53, a nut fastening tool 54, and a tool replacement mechanism 55. The tool replacement mechanism 55, each of which holds the support pin supplying tool 51, the nut supplying tool 52, the nut tightening tool 53, and the nut fastening tool 54. The tool replacement mechanism 55 has, for example, a rotating mechanism rotating in R3 and R4 directions about axes O3 and O4 respectively, and a sliding mechanism moving in the X direction. This configuration allows the tool replacement mechanism 55 to replace tools for each procedure. FIG. 7 is a schematic of a front sectional view of the supply manipulators. As illustrated in FIG. 7, the supply manipulator 50, each of which is movable also in a Z direction which is the vertical direction. The supply manipulator 50 is capable of supplying a new support pin 29 to the lower flange 15, while replacing the tools in accordance with the predetermined procedure.

The rotating means 75 of the present embodiment is a driving source for driving support pin rotating tools 48 and 49 illustrated in FIG. 3. The rotating means 75 is capable of rotating blades 72. The blades 72, each of which is inserted into the slit 24 of the support pin 20 when the support pin 20 is moved from above to the inside of the support pin rotating tools 48 and 49. Accordingly, in the rotating means 75, when driving force is applied to the support pin rotating tools 48 and 49, each of the blades 72 inserted into the slit 24 is allowed to impart rotational force to the support pin main body 22. In the present embodiment, a support pin fixing tool 59 illustrated in FIG. 4 has the blade 72, but does not rotate. It should be noted that in place of the support pin fixing tool 59, the above described support pin rotating tools 48 and 49 may be used.

The support pin retrieval mechanism 60 of the present embodiment has a support pin retrieval tray 61, and a support pin retrieval basket 62. The support pin retrieval tray 61 is a retrieval passage for collecting the nut 21 and the support pin main body 22 retrieved by the retrieval manipulator 40 together in the support pin retrieval basket 62. The support pin retrieval basket 62 is storage capable of storing a predetermined amount of the retrieved nuts 21 and support pin main bodies 22. It is preferable that the support pin replacing apparatus 1, as illustrated in FIG. 3, has a monitor 69 which is an imaging device in order to monitor operational status in the retrieval manipulator 40 and the supply manipulator 50.

Figures 1, 8:
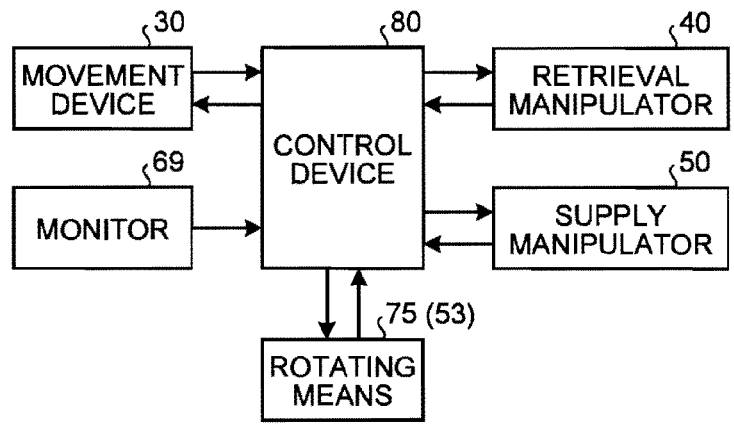
Figures 2, 8:
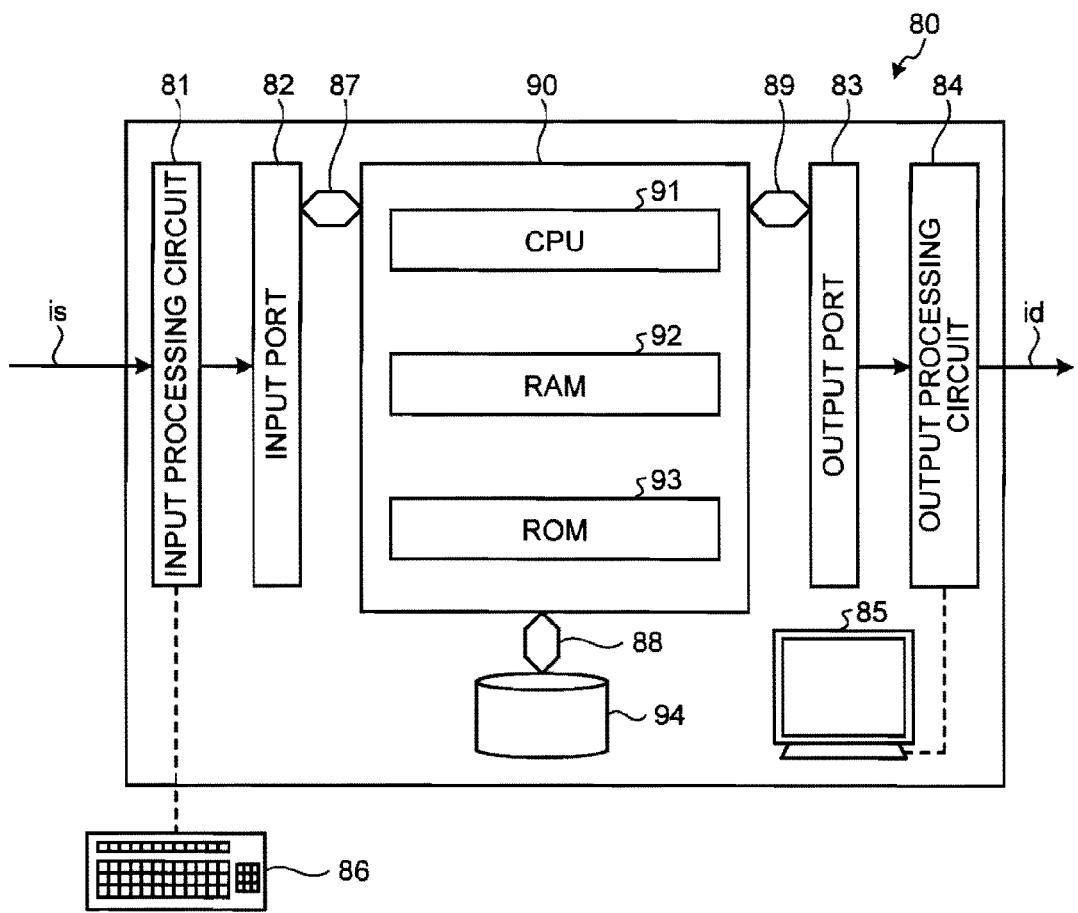

FIG. 8-1 is a block diagram illustrating a system of the support pin replacing apparatus for the control rod cluster guide tube. The support pin replacing apparatus 1 has the control device 80. The control device 80 is connected to the movement device 30, the retrieval manipulator 40, the supply manipulator 50, the monitor 69, and the rotating means 75. The control device 80 acquires imaging information from the monitor 69. Further, the control device 80 is a device capable of controlling the movement device 30, the retrieval manipulator 40, the supply manipulator 50, and the rotating means 75.

FIG. 8-2 is an illustrative view illustrating a control device. The control device 80 will be described with reference to FIG. 8-2. The control device 80 has an input processing circuit 81, an input port 82, a processing unit 90, a storage unit 94, an output port 83, an output processing circuit 84, a display device 85, and as occasion arises, may have such an input device 86 as a keyboard. The processing unit 90 includes, for example, a central processing unit (CPU) 91, a random access memory (RAM) 92, and a read only memory (ROM) 93.

The processing unit 90, the storage unit 94, the input port 82, and the output port 83 are interconnected to one another via a bus 87, a bus 88, and a bus 89. Through the bus 87, the bus 88, and the bus 89, the CPU 91 of the processing unit 90 is configured to exchange control data with the storage unit 94 and with the input port 82 and the output port 83 bilaterally, and issues commands unilaterally.

The input processing circuit 81 is connected to the input port 82. Data is from the rotating means 75 are connected to the input processing circuit 81. The data is are converted into signals that can be utilized in the processing unit 90 by a noise filter or an A/D converter included in the input processing circuit 81, and then are transferred to the processing unit 90 via the input port 82. This configuration allows the processing unit 90 to acquire necessary information.

The output processing circuit 84 is connected to the output port 83. The display device 85 and a terminal for an external output are connected to the output processing circuit 84. The output processing circuit 84 is provided with a display device control circuit, a control signal circuit of the movement device 30, the retrieval manipulator 40, the supply manipulator 50, and the rotating means 75, a signal amplifying circuit, and the like. The output processing circuit 84 outputs an instruction signal id that is transmitted to the movement device 30, the retrieval manipulator 40, the supply manipulator 50, and the rotating means 75. For the display device 85, for example, a liquid crystal display panel or a cathode ray tube (CRT) may be used.

In the storage unit 94, computer programs including operational procedure of the support pin replacing apparatus 1 are stored. The storage unit 94 can be constituted by a volatile memory such as a RAM, a nonvolatile memory such as a flush memory, a hard disk drive, or a combination thereof.

The computer programs may implement operational procedures of the support pin replacing apparatus 1 in combination with computer programs that have already been stored in the processing unit 90. Further, the control device 80 may implement the operational procedures of the support pin replacing apparatus 1 using dedicated hardware in place of the computer programs.

Also, the operational procedures of the support pin replacing apparatus 1 can be implemented by executing a program prepared in advance using a personal computer, a work station, or a computer system such as a computer for plant control, or the like. Further, this program can be stored on a computer-readable recording medium such as recording device including a hard disk, a flexible disk (FD), a ROM, a CD-ROM, an MO, a DVD, and a flush memory, read out from the computer-readable medium, and thus executed by computers. It should be noted that the term "computer system" used here includes both OS and hardware such as peripheral devices.

Further, the term "computer-readable recording medium" may include a medium that dynamically holds a program for a short time, such as a communications line when the program is transmitted through a network such as the Internet or a communications line including a telephone line, or a medium that holds the program for a set period of time such as a volatile memory in a computer system serving as a server or a client in that case. In addition, the program may be those for implementing a part of the above described functions, and may further be those capable of implementing the above described functions in combination with programs that have already been stored in the computer system.

Figure 9:
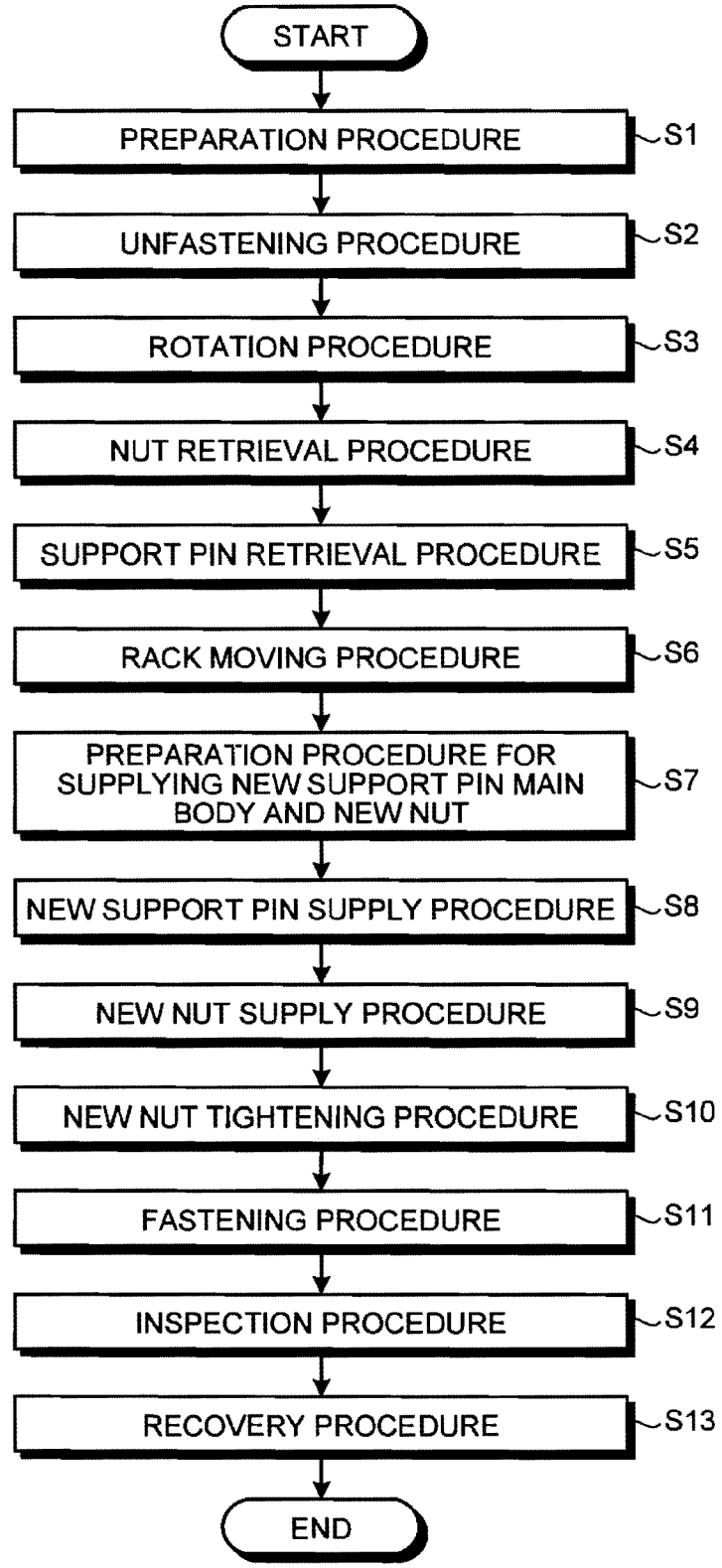
FIG. 9 is a flow chart illustrating a replacement procedure of the support pin.

Next, procedures for the operation of the support pin replacing apparatus 1 will be described. FIG. 9 is a flow chart illustrating a replacement procedure of the support pin. The procedure for the operation of the support pin replacing apparatus 1 will be described according to the flow chart illustrated in FIG. 9. First, a preparation procedure for installing the control rod cluster guide tube 10 into the frame 2 of the support pin replacing apparatus 1 is performed using the crane 155, or the like (step S1). At this point, since the frame 2 of the support pin replacing apparatus 1 and the control rod cluster guide tube temporary stand 151 are under the light water W, it is not necessary to lift the control rod cluster guide tube 10 to the air in the preparation procedure.

Figures 1, 10:
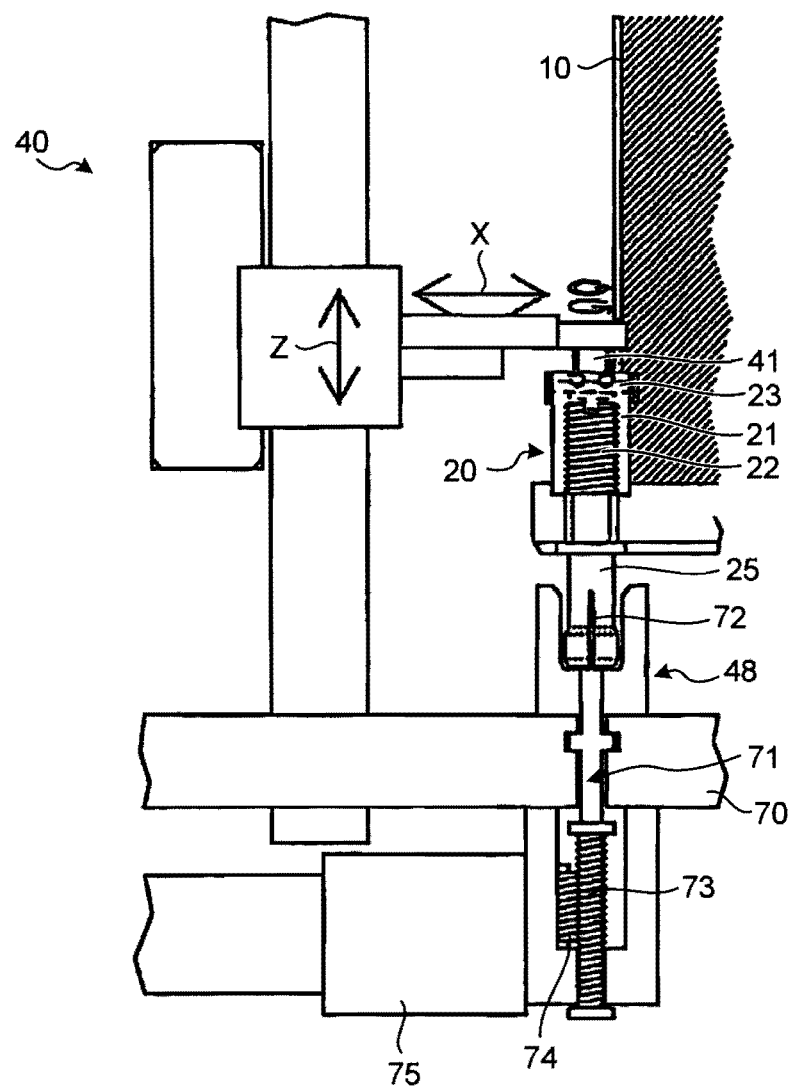
Figures 2, 10:
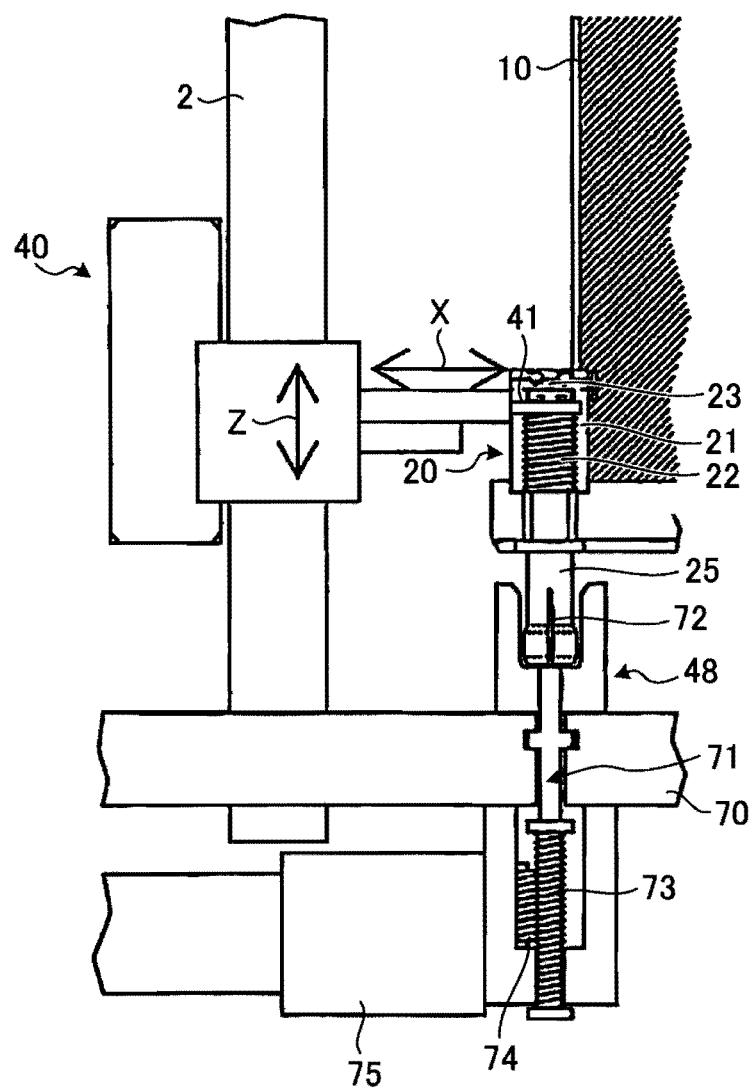

Next, in the support pin replacing apparatus 1, an unfastening procedure for unfastening the fixed fastening between the nut 21 and the support pin main body 22 is performed by the retrieval manipulator 40 (step S2). It is preferable that electrical discharge machining is performed by the electrical discharge machining tool 41 for unfastening the fixed fastening. Accordingly, unfastening operation can be performed under the light water W. As a result, the unfastening operation can be performed in the state where radiation emitted from the control rod cluster guide tube 10 is shielded by light water W. FIG. 10-1 is an illustrative view illustrating an example of an unfastening procedure. For example, the support pin rotating tool 48 has the blade 72 that is inserted into the slit 24, a blade main body 71 that has a rotation transmission unit 73, and the rotating means 75 that has a rotation driving unit 74. Further, in the support pin rotating tool 48, the blade main body 71 passes through a frame bottom portion 70 that is coupled to the frame 2 illustrated in FIG. 3. Accordingly, the support portion 25 is fixed by the blade 72 that is inserted into the slit 24, and is brought into a state of being positioned. The electrical discharge machining tool 41 is, as illustrated in FIG. 10-1, inserted from above of the support pin 20 to cut the locking pin 23 and cut the welding between the locking pin 23 and the support pin main body 22. Cutting the welding that has been securing the fastening between the nut 21 and the support pin main body 22 allows the nut 21 and the support pin main body 22 to rotate. Accordingly, when the support pin main body 22 is rotated, the nut 21 is loosened and can be removed. FIG. 10-2 is an illustrative view illustrating a different example of an unfastening procedure. As illustrated in FIG. 10-2, the electrical discharge machining tool 41 is horizontally inserted to the nut 21 from the side surface of the nut 21 while performing discharge machining so as to cut the nut 21 and the support pin main body 22 below the locking pin 23. Accordingly, the welding between the nut 21 and the support pin main body 22 does not contribute to fixing between the nut 21 and the support pin main body 22 anymore. As a result, when the support pin main body 22 is rotated, the nut 21 can be removed.

Figure 11:
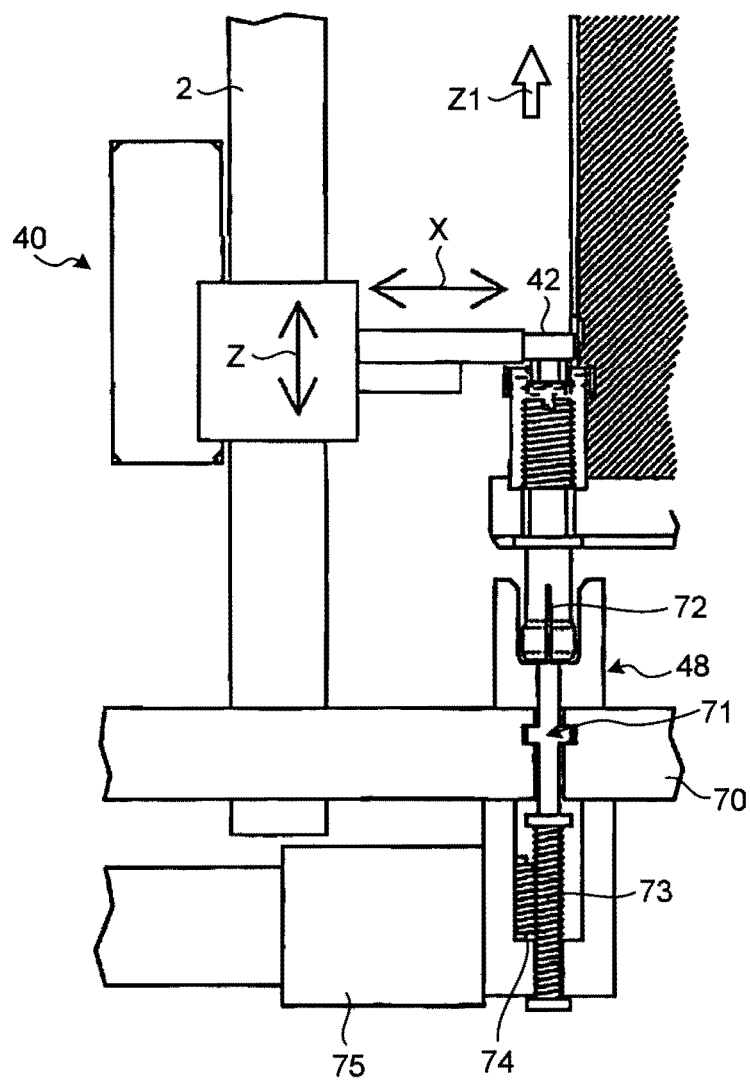
FIG. 11 is an illustrative view illustrating an example of a rotation procedure.
Figure 12:
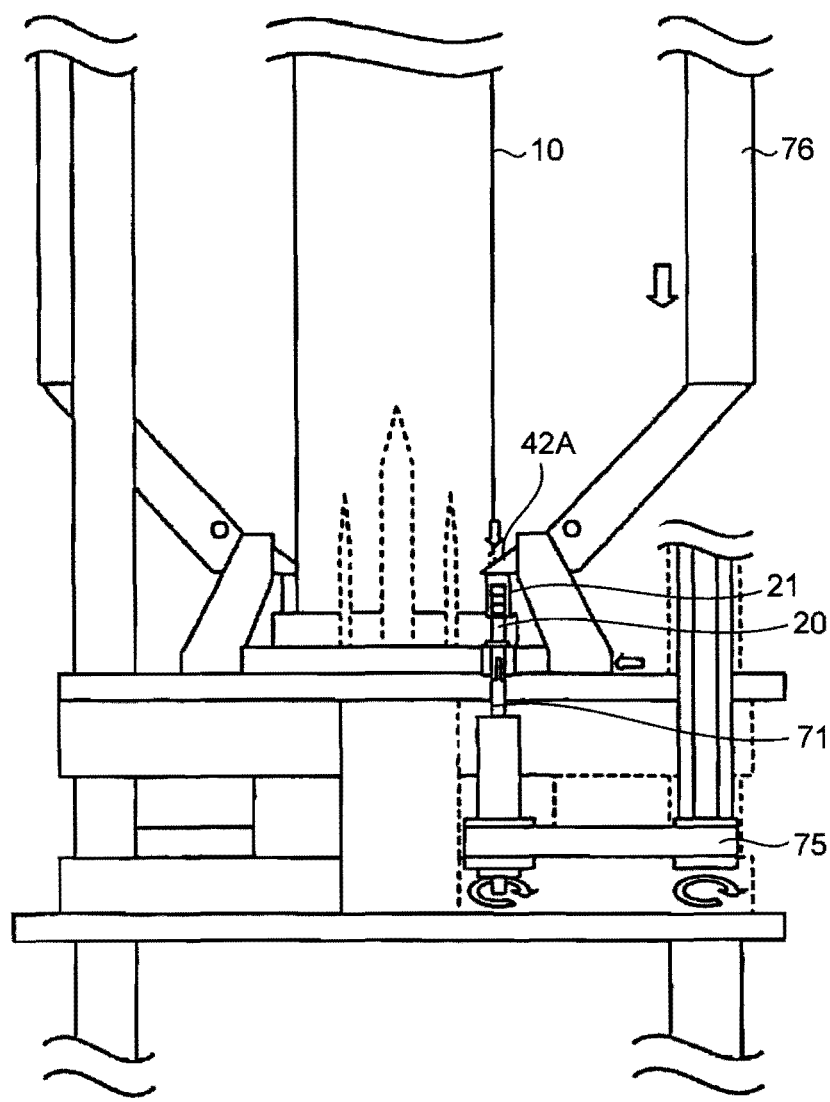
FIG. 12 is an illustrative view illustrating a different example of a rotation procedure.

Next, in the support pin replacing apparatus 1, a rotation procedure for rotating the support pin main body 22 is performed by the rotating means 75 (step S3). FIG. 11 is an illustrative view illustrating an example of a rotation procedure. Since the nut 21 and the support pin main body 22 are screwed, the fixing tool 42 of the retrieval manipulator 40 rotates the blade 72 while fixing the nut 21 in a stationary manner. Also, the rotating means 75 is capable of rotating the blade 72 using the driving force to the blade main body 71 transmitted via the rotation driving unit 74 and the rotation transmission unit 73. As the screw fastening between the nut 21 and the support pin main body 22 is loosen with the rotation of the blade 72, the distance between the nut 21 and the support pin main body 22 increases. Therefore, the control device 80 calculates variation in the distance between the nut 21 and the support pin main body 22 on the basis of rotational frequency of the rotating means 75 to control the motion cradle rail lifting device 31 of the movement device 30, thereby moving the control rod cluster guide tube 10 upward in a direction of Z1 illustrated in FIG. 11 by an extent of the above variation in the distance. As a result, the nut 21 and the support pin main body 22 are unscrewed without locking to each other. FIG. 12 is an illustrative view illustrating a different example of a rotation procedure. A fixing tool 42A may have, for example, a pressing means 76 for fixing the nut 21 in a stationary manner by pressing the nut 21 downward.

Figure 13:
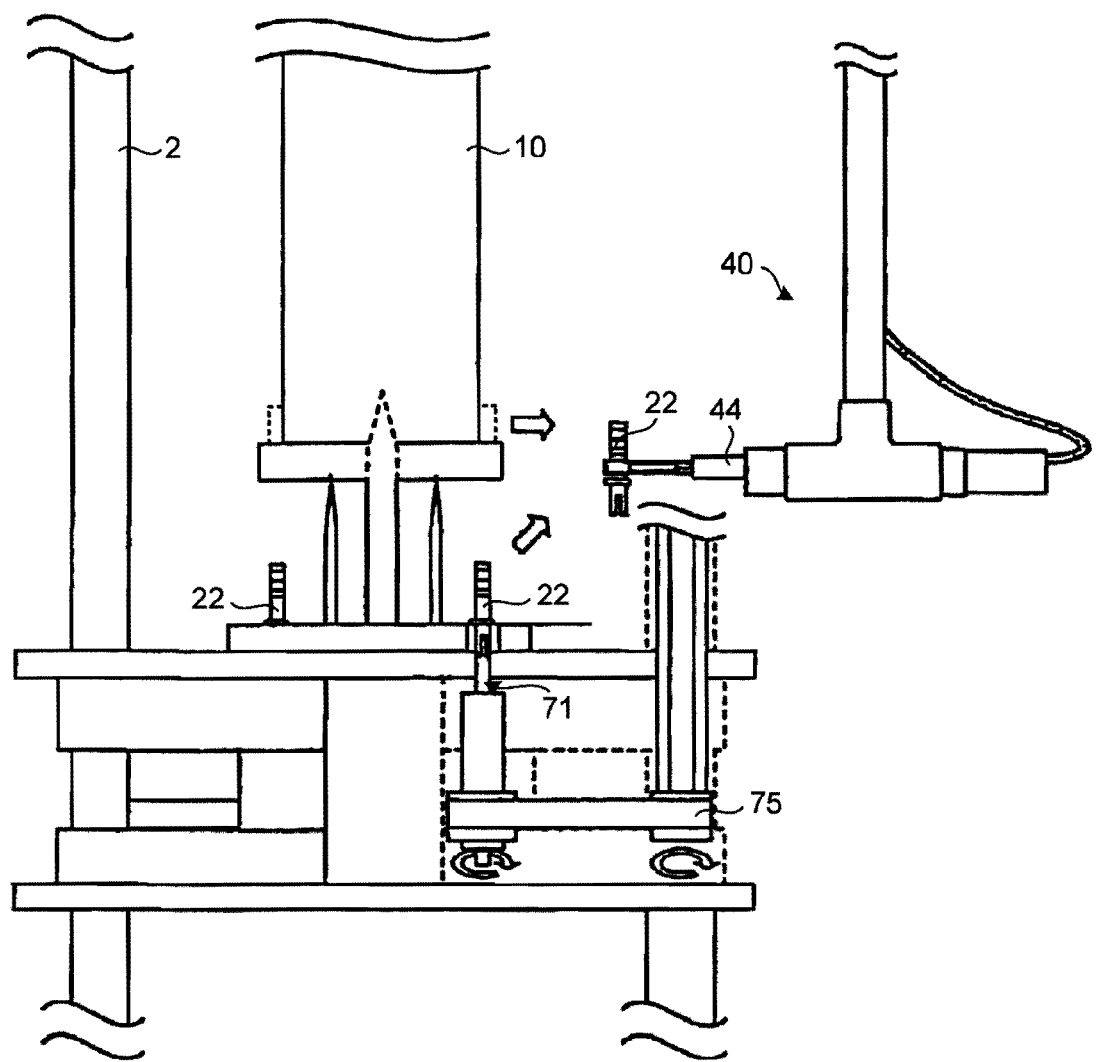
FIG. 13 is an illustrative view illustrating an example of a support pin retrieval procedure.

Next, in the support pin replacing apparatus 1, a nut retrieval procedure for retrieving the unscrewed nut 21 is performed (step S4). Then, in the support pin replacing apparatus 1, a support pin retrieval procedure for retrieving the unscrewed support pin main body 22 is performed (step S5). FIG. 13 is an illustrative view illustrating an example of a support pin retrieval procedure. The support pin retrieval tool 44 grasps the support pin main body 22, and transports the support pin main body 22 to the support pin retrieval tray 61. In the support pin replacing apparatus 1 of the embodiment, although the support pin retrieval procedure is performed after the nut retrieval procedure, the nut retrieval procedure may be performed after the support pin retrieval procedure. Alternatively, the support pin retrieval procedure and the nut retrieval procedure may be simultaneously performed in the support pin replacing apparatus 1.

Next, in the support pin replacing apparatus 1, as illustrated in FIG. 4, the motion cradle rail sliding device 33 is driven to perform a rack moving procedure, in which the control rod cluster guide tube 10 is moved from the retrieval operation rack 2A of the retrieval manipulator 40 to the supply operation rack 2B of the supply manipulator 50 in a Y direction (step S6).

Figure 14:
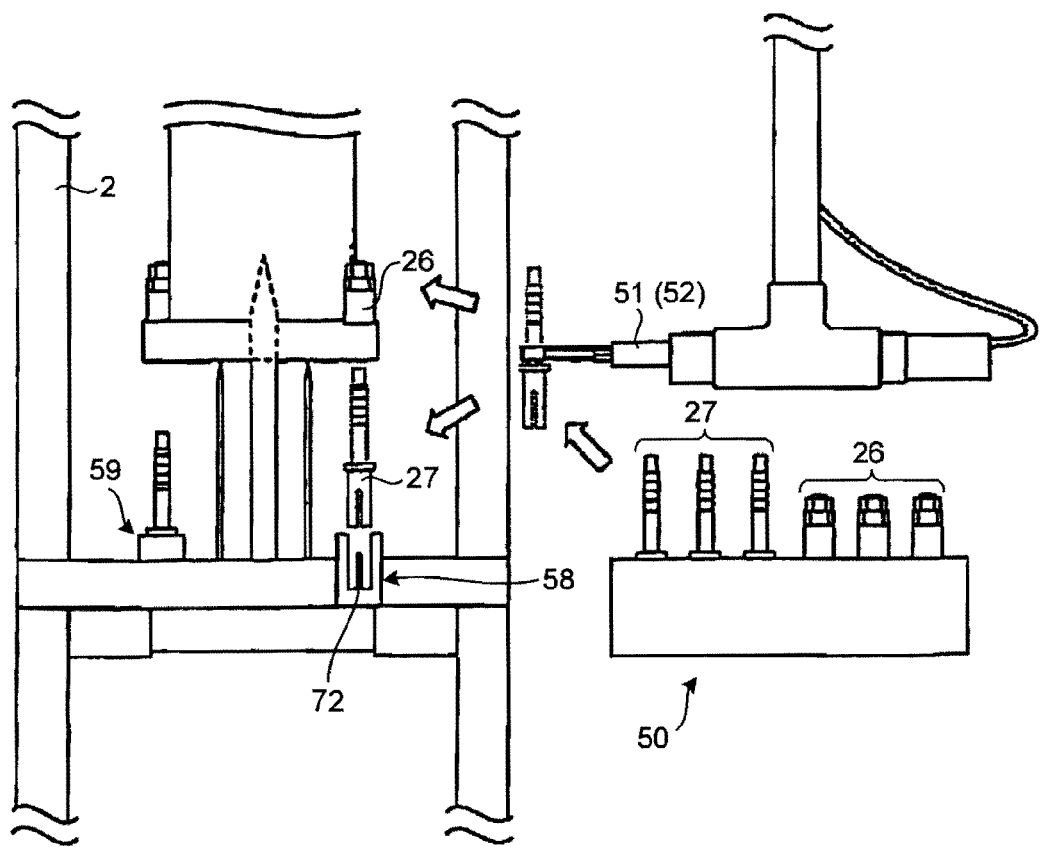
FIG. 14 is an illustrative view illustrating an example of a new support pin supply procedure and a new nut supply procedure.

FIG. 14 is an illustrative view illustrating an example of a new support pin supply procedure and a new nut supply procedure. In the support pin replacing apparatus 1, a preparation procedure for supplying a new support pin main body and a new nut is performed, in which a new support pin main body 27 and a new nut 26 are supplied to a supply tray of the supply manipulator 50 (step S7). It should be noted that in the case where the new support pin main body 27 and the new nut 26 have already been supplied to the supply manipulator 50, step S7 may be omitted. Next, in the support pin replacing apparatus 1, a new support pin supply procedure is performed, in which the support pin main bodies 27 of the supply manipulator 50 are supplied to the support pin fixing tools 58 and 59 (step S8). The support pin fixing tools 58 and 59 have the blade 72 fixed thereto. The blade 72 is inserted to the slit 24 of the support pin main body 27 to regulate the direction of the support pin main body 27. The support pin supplying tool 51 grasps the new support pin main body 27, and supplies the new support pin main bodies 27 to the support pin fixing tools 58 and 59. Similarly, in the support pin replacing apparatus 1, the nut supplying tool 52 performs a new nut supply procedure, in which the new nut 26 is supplied on the lower flange 15 (step S9). It should be noted that in the support pin replacing apparatus 1 of the embodiment, although the new nut supply procedure is performed after the new support pin supply procedure, the new support pin supply procedure may be performed after the new nut supply procedure. Alternatively, the new support pin supply procedure and the new nut supply procedure may be simultaneously performed in the support pin replacing apparatus 1.

Figure 15:
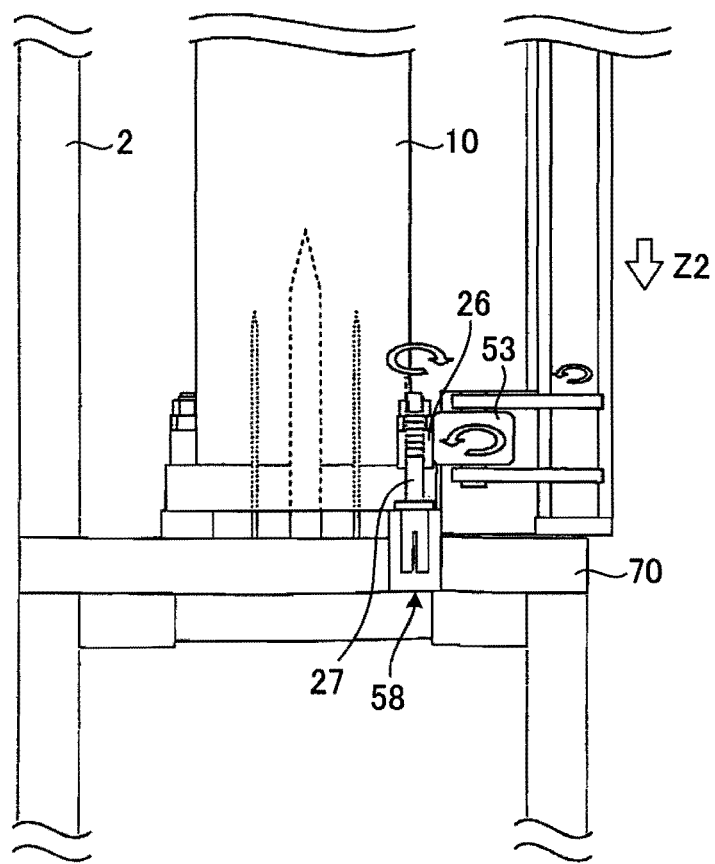
FIG. 15 is an illustrative view illustrating an example of a new nut tightening procedure.
Figures 1, 16:
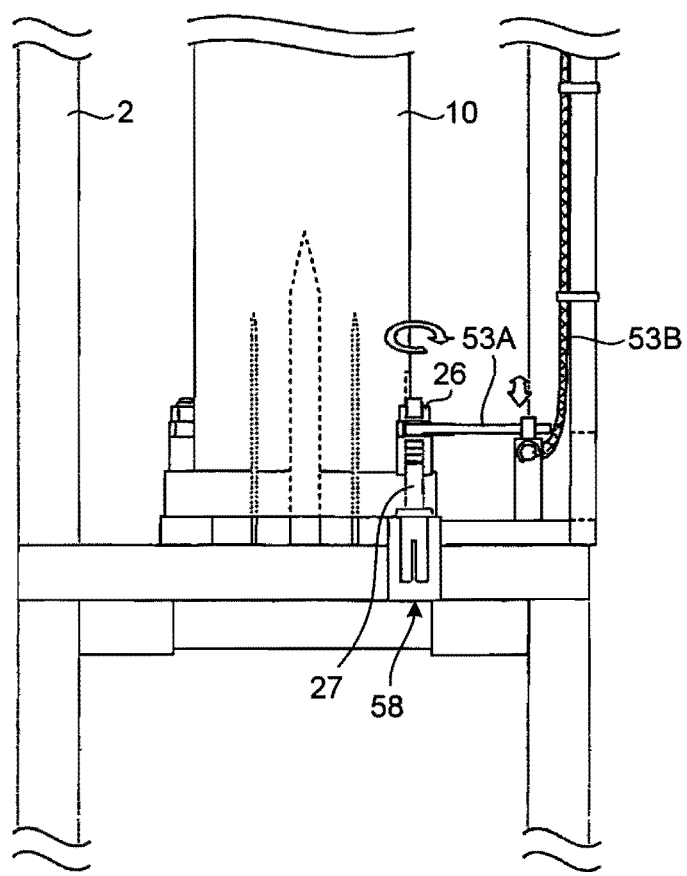
Figures 2, 16:
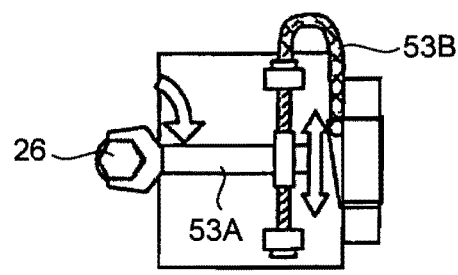

FIG. 15 is an illustrative view illustrating an example of a new nut tightening procedure. The support pin replacing apparatus 1 controls the motion cradle rail lifting device 31 of the movement device 30 to move the control rod cluster guide tube 10 downward so that the support pin main body 27 passes through the lower flange 15 and the support pin main body 27 is inserted to the nut 26. In the support pin replacing apparatus 1, a new nut tightening procedure is performed by the nut tightening tool 53 of the supply manipulator 50 (step S10). As illustrated in FIG. 15, the nut tightening tool 53 is a second rotating means, and is a rotary drive source for imparting rotation to the nut 26. For example, the nut tightening tool 53 has a structure, in which a rubber roller is attached to a rotating shaft of a motor. Through the rubber roller, rotation of the motor can be transmitted to the nut 26. The support pin main bodies 27 are fixed by the support pin fixing tools 58 and 59. Here, the screw fastening between the nut 26 and the support pin main body 27 is tightened in accordance with the rotation imparted by the nut tightening tool 53, and the distance between the nut 26 and the support pin main body 27 becomes smaller. Accordingly, the control device 80 calculates variation in the distance between the nut 26 and the support pin main body 27 on the basis of the rotational frequency of the nut tightening tool 53 to control the motion cradle rail lifting device 31 of the movement device 30, thereby moving the control rod cluster guide tube 10 downward in a direction of Z2 illustrated in FIG. 15 by an extent of the above variation in the distance. As a result, the nut 26 and the support pin main body 27 are screwed without locking to each other. FIG. 16-1 is an illustrative view illustrating a different example of a new nut tightening procedure. FIG. 16-2 is an enlarged top view illustrating a main portion of FIG. 16-1. A nut tightening tool 53A illustrated in FIG. 16-2 and FIG. 16-1 is in the form of a wrench. A driving source 53B that drives the nut tightening tool 53A has a mechanism, in which linear motion is converted to the rotational direction of the nut tightening tool 53A. The control device 80 drives the driving source 53B so that the tightening of the nut 26 being fitted with the nut tightening tool 53A, onto the support pin main body 27 can be controlled.

Figure 17:
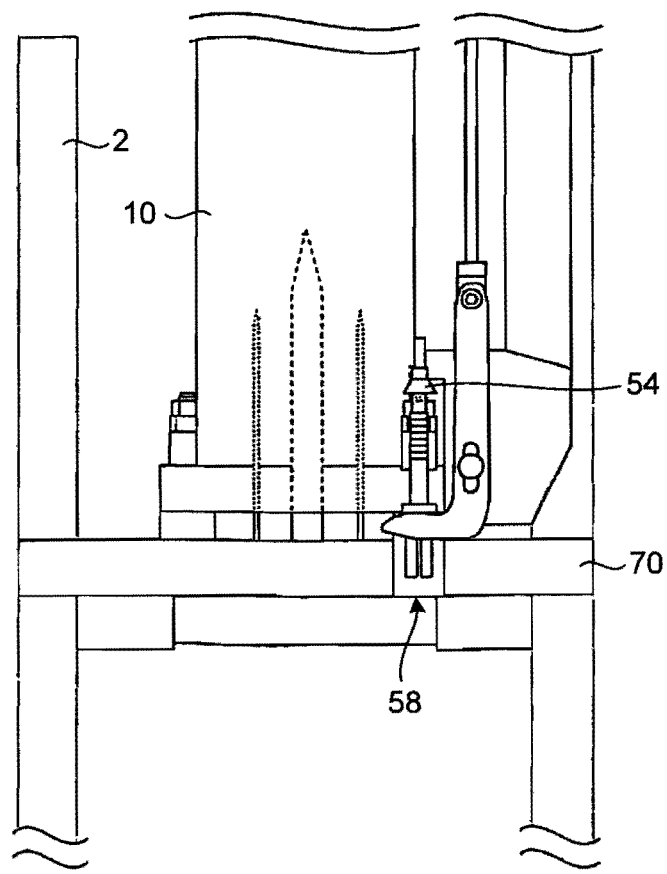
FIG. 17 is an illustrative view illustrating an example of a fastening procedure.
Figures 1, 18:
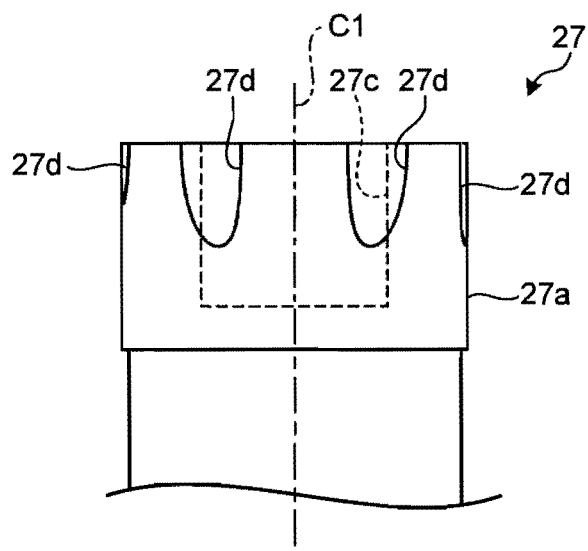
Figures 2, 18:
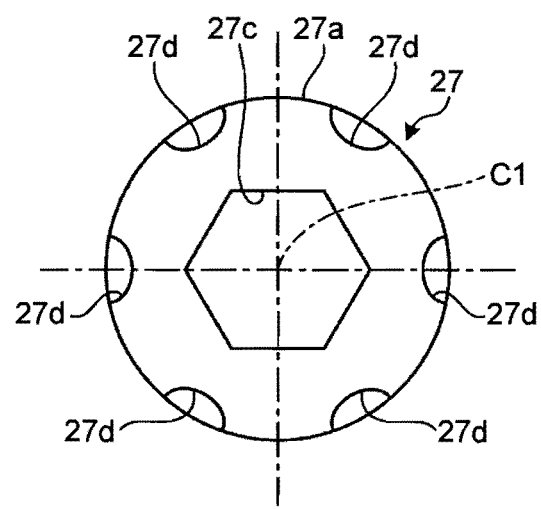
Figure 19:
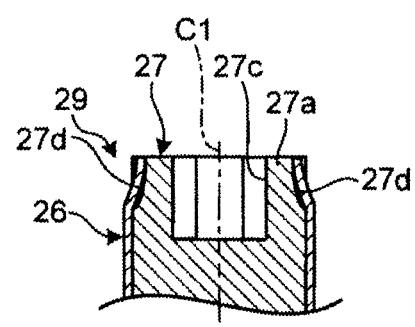
FIG. 19 is a view schematically illustrating the support pin in a fastened state.

FIG. 17 is an illustrative view illustrating an example of a fastening procedure. FIG. 18-1 is a schematic of an example of the support pin. FIG. 18-2 is a top view of FIG. 18-1. FIG. 19 is a view schematically illustrating the support pin in a fastened state. In the support pin replacing apparatus 1, a fastening procedure is performed, in which the fastening between the nut 26 and the support pin main body 27 is secured (step S11). In the fastening procedure, in the case of attaching the support pin 20 illustrated in FIG. 5-1 and FIG. 5-2 for example, the nut fastening tool 54 performs welding. Or, the nut fastening tool 54 illustrated in FIG. 17 performs caulking. The nut fastening tool 54 is used, for example, in the case of securing the fastening between the support pin main body 27 and the nut 26 illustrated in FIG. 18-1 and FIG. 18-2.

As illustrated in FIG. 18-1, the support pin main body 27 has a head 27a formed in a columnar shape. The head 27a has a fitting concave portion 27c formed on the end surface thereof. The fitting concave portion 27c is a concave portion which the nut fastening tool 54 uses as the position regulation. The head 27a has a fitting groove 27d formed on the circumferential surface thereof. The fitting groove 27d is formed in the area from the end surface to the circumferential surface of the head 27a, and is provided in at least one location. For a plurality of fitting grooves 27d (six fitting grooves in the present embodiment), the plurality of fitting grooves 27d is provided at regular intervals about a central axis C1 of the support pin main body 27, as illustrated in FIG. 18-2. Further, for a plurality of fitting grooves 27d, the plurality of fitting grooves 27d is preferably oppositely provided relative to the central axis C1 of the support pin main body 27, as illustrated in FIG. 18-2. Here, the nut 26 has a cylindrical shape, and is caulked inward by the nut fastening tool 54 illustrated in FIG. 17. As illustrated in FIG. 19, for example, the caulked portion of the nut 26 is pushed into the fitting groove 27d of the support pin main body 27. Accordingly, the support pin main body 27 is prevented from rotating by means of the fitting between a portion of the nut 26 and the fitting groove 27d of the support pin main body 27, and the fastening as the support pin 29 is thus secured.

Next, in the support pin replacing apparatus 1, an inspection procedure is performed (step S12). For example, fastening condition of the support pin 29 is inspected on the basis of imaging information on the monitor 69. Then, in the support pin replacing apparatus 1, a recovery procedure is performed (step S13). For example, the control rod cluster guide tube 10, with the support pin thereof having been replaced is returned to the control rod cluster guide tube temporary stand 151.

As described above, the support pin replacing apparatus 1 of the present embodiment includes the frame 2 submerged in water, the movement device 30 for holding the control rod cluster guide tube 10 and moving the control rod cluster guide tube 10 along the frame 2, the retrieval manipulator 40 for retrieving the support pin 20 of the control rod cluster guide tube 10 under the water, the supply manipulator 50 for supplying a new support pin 29 to the control rod cluster guide tube 10 under the water, the rotating means 75, 53, 53B for imparting rotation for loosening or tightening the fastening between the nut 21 of the support pin 20 or the nut 26 of the new support pin 29 and the support pin main body 22 or the support pin main body 27 respectively, and the control device 80 for calculating variation in the distance between the nut 21 or the nut 26 and the support pin main body 22 or the support pin main body 27 respectively on the basis of the rotation, and controlling the control rod cluster guide tube 10 to move along the frame 2 in accordance with the variation in distance calculated by the movement device 30.

Accordingly, automation of replacement of the support pin 20 can be achieved in an underwater environment. As a result, effects of radiation on operators can be reduced. Further, operational time required for replacement of the support pin 20 can be shortened.

It is preferable that the control rod cluster guide tube 10 includes a middle flange 11 for fixing to the upper core support plate 113, and a lower flange 15 for fixing to the upper core plate 111 by means of the support pin 20 or the new support pin 29. It is also preferable that the movement device 30 holds the middle flange 11. Accordingly, the control rod cluster guide tube 10 can be held with the posture thereof being constantly stable.

It is preferable that the retrieval manipulator 40 has an unfastening means for unfastening the fixed fastening between the nut 21 and the support pin main body 22. It is preferable that the unfastening means is the electrical discharge machining tool 41. It is also preferable that the fixed fastening between the nut 21 and the support pin main body 22 is unfastened by electrical discharge machining of the electrical discharge machining tool 41, so that the nut 21 and the support pin main body 22 are brought into a rotatable state. Accordingly, the fastening between the nut 21 of the support pin 20 and the support pin main body 22 can be loosened.

It is preferable that the frame 2 is partitioned such that the retrieval operation rack 2A, in which the retrieval manipulator 40 operates, is adjacent to the supply operation rack 2B, in which the supply manipulator 50 operates. It is also preferable that the movement device 30 moves the control rod cluster guide tube 10 from the retrieval operation rack 2A to the supply operation rack 2B. Accordingly, the time required for replacement of the support pin 20 with the new support pin 29 can be shortened.

It is preferable that the retrieval manipulator 40 and the supply manipulator 50 allow replacement of tools. Accordingly, the operational time can be shortened.

INDUSTRIAL APPLICABILITY

Although the above described embodiment has been described using the example of a pressurized water reactor nuclear power plant, the present invention may also be applied to a boiling water nuclear reactor, fast reactor, and other types of nuclear power plants.

REFERENCE SIGNS LIST

1 SUPPORT PIN REPLACING APPARATUS
2 FRAME
10 CONTROL ROD CLUSTER GUIDE TUBE
11 MIDDLE FLANGE
15 LOWER FLANGE
20, 29 SUPPORT PIN
21, 26 NUT
22, 27 SUPPORT PIN MAIN BODY
23 LOCKING PIN
24 SLIT

25 SUPPORT PORTION
30 MOVEMENT DEVICE
31 MOTION CRADLE RAIL LIFTING DEVICE
33 MOTION CRADLE RAIL SLIDING DEVICE
35 MOTION CRADLE
40 RETRIEVAL MANIPULATOR
41 ELECTRICAL DISCHARGE MACHINING TOOL
50 SUPPLY MANIPULATOR
60 SUPPORT PIN RETRIEVAL MECHANISM
72 BLADE
75 ROTATING MEANS
80 CONTROL DEVICE
100 NUCLEAR REACTOR
111 UPPER CORE PLATE
113 UPPER CORE SUPPORT PLATE
123 CONTROL ROD CLUSTER
140 CONTROL ROD CLUSTER DRIVE SHAFT
151 CONTROL ROD CLUSTER GUIDE TUBE TEMPORARY STAND
152 CONTROL ROD CLUSTER DRIVE SHAFT TEMPORARY STAND
153 CRADLE
155 CRANE
W LIGHT WATER

The invention claimed is:

1. A support pin replacing apparatus for a control rod cluster guide tube comprising:
    a frame submerged in water;
    a movement device which is configured to hold the control rod cluster guide tube and move the control rod cluster guide tube along the frame;
    a retrieval manipulator which is configured to retrieve a support pin of the control rod cluster guide tube under the water;
    a supply manipulator which is configured to supply a new support pin to the control rod cluster guide tube in the water;
    a rotating means, wherein the rotating means is configured to impart rotation to loosen or tighten a fastening between a nut of the support pin and a support pin main body, and wherein the rotating means is configured to impart rotation to loosen or tighten a fastening between a nut of the new support pin and a support pin main body; and
    a control device which is configured to calculate variation in a distance between the nut of the support pin and the support pin main body on the basis of the rotation, and controls the control rod cluster guide tube to move along the frame by the movement device in accordance with the variation in the distance calculated to compensate an increase in the distance between the nut of the support pin and a support pin main body when the fastening between the nut of the support pin and a support pin main body is loosened with the rotation of the rotating means.

2. The support pin replacing apparatus for a control rod cluster guide tube according to claim 1, wherein
    the control rod cluster guide tube includes a middle flange to be fixed to an upper core support plate, and a lower flange to be fixed to an upper core plate by means of the support pin or the new support pin, and
    the movement device is configured to hold the middle flange.

3. The support pin replacing apparatus for a control rod cluster guide tube according to claim 1, wherein
    the retrieval manipulator has an unfastening means which is configured to unfasten a fixed fastening between the nut and the support pin main body.

4. The support pin replacing apparatus for a control rod cluster guide tube according to claim 3, wherein
    the unfastening means is an electrical discharge machining tool, and
    the fixed fastening between the nut and the support pin main body is configured to be unfastened by electrical discharge machining of the electrical discharge machining tool so that the nut and the support pin main body are brought into a rotatable state.

5. The support pin replacing apparatus for a control rod cluster guide tube according to claim 1, wherein
    the frame is partitioned such that a retrieval operation rack, in which the retrieval manipulator operates is adjacent to a supply operation rack, in which the supply manipulator operates, and
    the movement device is configured to move the control rod cluster guide tube from the retrieval operation rack to the supply operation rack.

6. The support pin replacing apparatus for a control rod cluster guide tube according to claim 1, wherein
    the retrieval manipulator including a tool replacement mechanism which includes an electrical discharge machining tool, a fixing tool, a nut retrieval tool, and a support pin retrieval tool, and is configured to replace at least one tool among the electrical discharge machining tool, the fixing tool, the nut retrieval tool, and the support pin retrieval tool, and
    the supply manipulator including a tool replacement mechanism which includes a support pin supplying tool, a nut supplying tool, a nut tightening tool, and a nut fastening tool, and is configured to replace at least one tool among the support pin supplying tool, the nut supplying tool, the nut tightening tool, and the nut fastening tool.

* * * * *